Patented Jan. 25, 1944

2,339,775

UNITED STATES PATENT OFFICE 2,339,775

COATING COMPOSITION

Horace F. Ether, Upper Darby, Pa., assignor to E. I. du Pont de Nemours & Company, Wilmington, Del., a corporation of Delaware No Drawing. Application May 16, 1942, Serial No. 443,279

5 Claims. (Cl. 260—8)

This invention relates to vinyl resin coating compositions and more particularly to such compositions containing in part a vinyl halide resin forming material.

The production of resinous bodies by the partial or complete polymerization of a vinyl compound or a mixture of two or more vinyl compounds is well known. Vinyl resins possess many properties which make them desirable for use as protective coatings and also useful in molded and formed articles. In drying or baking such coatings applied to certain metals, for example bare tin plate or black iron, the polymeric vinyl compound tends to decompose at relatively low temperatures particularly if applied in thicknesses of coating ordinarily used for such resinous compositions. Even in thinner films decomposition takes place at relatively low temperatures. In order to develop other desirable properties in these vinyl resin coatings, it is necessary to heat or bake the coatings at higher temperatures. Polymeric vinyl compounds containing a vinyl halide are thus not thermally stable. Many types of materials have been proposed as thermal stabilizers to overcome the above difficulties but these in most instances possess certain inherent objections to their broad general use. Among such materials proposed as thermal stabilizers may be mentioned soaps of the alkali metals, alkaline earth metals, cadmium, lead, manganese, etc., blue lead; white lead; red lead and other lead compounds, such as chromate, hydroxide, etc., cadmium, lead and calcium stearate; organo-metallic aryl derivatives of lead and tin as tetra-phenyl lead, propyl triphenyl lead, tetra-phenyl tin, etc.; pitch containing quinoline or similar nitrogenous base; compounds such as resorcinol disalicylate, resorcinol dibenzoate, ortho, meta and para cresyl benzoate, etc.; quinine; complex heterocyclic nitrogenous bases; urea, substituted urea, urea salts and others.

The principal object of the present invention is the provision of vinyl resin compositions by means of which strongly adherent, substantially colorless and highly resistant coatings of finishes may be produced.

Another object is the provision of a novel process for producing such adherent and resistant coatings.

A further object is the provision of vinyl resin compositions and means of producing coatings therefrom which are free of objectionable ingredients and which may find broad general use.

Still another object is the provision of vinyl resin compositions which will produce strongly adherent, transparent, substantially colorless and highly resistant coatings and finishes which are economical to use.

A still further object is the provision of white and light colored vinyl resin compositions which will produce strongly adherent, highly resistant and substantialy non-discolored coatings and finishes.

Other objects will be apparent from the description of the invention which follows:

These objects are accomplished by adding to a vinyl resin composition, containing at least in part a vinyl halide resin, a relatively minor amount of a phospholipid from the group comprising cephaline and the lecithins. These materials occur in organic cellular material and are most commonly commercially obtainable from egg yolk and soya beans.

The invention will be more fully understood by the following examples which are given by way of illustration and not limitation except insofar as defined in the appended claims. The parts are by weight.

EXAMPLE I

| | Parts |
|---|---|
| Vinyl chloride-vinyl acetate polymer | 200 |
| Methyl ethyl ketone | 785 |
| Soya lecithin | 10 |

The ingredients were mixed in a conventional manner and the resin solution applied onto a suitably cleaned metal surface and baked at approximately 350° F. for about 30 minutes. There was produced in this manner a coating on the metal which was transparent, substantially colorless, tenaciously adherent and highly resistant to the action of chemicals and other deteriorating influences. The vinyl resin used in this example consisted of 85 parts of polymerized vinyl chloride and 15 parts of polymerized vinyl acetate.

When the vinyl resin solution as given above, free from the soya lecithin is similarly applied to a cleaned metal surface and baked for the same time period at approximately 350° F., it becomes dark brown or practically black and substantially deteriorated and has no practical value as a protective coating.

The vinyl resin polymer solution containing the thermal stabilizing agent may be baked at higher temperatures for shorter periods of time yielding equally satisfactory coatings. Such variations in time and temperature may be governed largely by available facilities and other conditions and will be readily apparent to those skilled in the art of producing such coatings.

Additional vinyl polymer resin compositions as above in which the amount of soya lecithin was varied viz. 1%, 2½%, 10%, and 25% based on the vinyl resin solids were prepared. Equally satisfactory results as previously described were obtained in all cases although in the compositions containing only 1.0% soya lecithin the thermal stability was of a lesser degree. In the compositions containing the higher percentages viz. 10 and 25% of soya lecithin an oily exudation was noticeable on the film after baking.

Similarly satisfactory results were also obtained when egg yolk lecithin and cephaline were used in place of the soya lecithin.

EXAMPLE II

|  | Parts |
|---|---|
| Chlorinated polyvinyl chloride | 98 |
| Methyl ethyl ketone | 896 |
| Cephaline (from soya bean) | 5 |

When the vinyl polymer resin solution is applied to a suitable cleaned metal surface as described under Example I and baked at approximately 350° F. for 30 minutes, a transparent, substantially colorless and strongly adherent protective film is obtained. When the same vinyl resin solution containing no cephaline and applied to a similar metal surface is baked at 350° F., a substantially black, brittle and poorly adherent film is obtained. Even when baked at temperatures sufficiently low to avoid appreciable discoloration, poorly adherent films or coatings are obtained which are not satisfactory from a practical standpoint.

The time and temperature of baking for vinyl resin compositions of this type containing the thermal stabilizing agent may be varied according to particular needs as described under Example I.

EXAMPLE III

*White vinyl resin polymer (enamel A)*

|  | Parts |
|---|---|
| Titanium dioxide pigment | 12.8 |
| Vinyl chloride-vinyl acetate polymer | 15.0 |
| Butyl phthalyl butyl glycollate | 6.4 |
| Methyl isobutyl ketone | 26.3 |
| Methyl amyl ketone | 6.6 |
| Toluene | 26.3 |
| Xylene | 6.6 |

This enamel may be prepared by any of the suitable conventional procedures well known to those versed in the art of preparing synthetic resin enamels or by any other convenient means.

When this enamel is sprayed or flowed onto a suitably prepared steel panel and baked for approximately 30 minutes at about 375° F. the film is badly discolored and entirely decomposed so that it has no practical value as an enamel finish. Even when baked at a lower temperature, as 350° F., for the same time the film is badly discolored and decomposed. If baked at still lower temperatures the color is improved but a satisfactorily hard, tenaciously adherent and highly resistant finish is not obtained.

The vinyl resin polymers when stabilized as herein disclosed possess many desirable properties for use as the principal film forming vehicle in high bake synthetic resin enamels. The compositions, however, in the present state of the art are not thermally stable and in addition to forming poor films when baked at suitably high temperatures or even at lower temperatures for longer periods of time, are badly discolored and unsatisfactory in this respect particularly in white enamels.

If to the above (enamel A) is added soya lecithin to the extent of approximately 5% to obtain enamel B, entirely different results are obtained as hereinafter described.

*Enamel B*

|  | Parts |
|---|---|
| White vinyl resin polymer (enamel A) | 87.00 |
| Soya lecithin | .65 |
| Toluene | 12.35 |

The soya lecithin is preferably added by premixing with the toluene and the entire mass well agitated.

When enamel B is sprayed or flowed onto a suitably prepared steel panel and baked for approximately 30 minutes at about 375° F. a hard, tenaciously adherent and highly resistant finish is obtained possessing a satisfactory whiteness. This enamel may also be baked, if desired, at a higher temperature, e. g., 400° F. with equally good results.

In the examples similar results are obtained from enamels in which the soya lecithin is replaced by the same amount of cephaline.

EXAMPLE IV

*White vinyl resin polymer primer*

|  | Parts |
|---|---|
| Titanium dioxide pigment | 9.6 |
| Antimony oxide pigment | 3.2 |
| Vinyl chloride-vinyl acetate polymer | 15.0 |
| Butyl phthalyl butyl glycollate | 6.4 |
| Methyl amyl ketone | 6.6 |
| Methyl isobutyl ketone | 26.3 |
| Toluene | 26.3 |
| Xylene | 6.6 |

This composition may be prepared as previously described or by any other convenient procedure.

When applied by spraying, flowing or any other commonly known procedure to a suitably prepared panel and baked for about 30 minutes at 375° F. a primer coating is obtained which is unsatisfactory from the standpoint of adhesion to the metal, color (being from tan to light brown instead of white) and general quality required in a satisfactory priming coating.

If, however, there is added to this priming composition, 5% of cephaline based on the vinyl resin polymer, as described under Example III an entirely satisfactory composition is obtained. If the composition containing the cephaline is applied to a steel panel and baked for about 30 minutes at approximately 375° F., a primer coating is obtained which is tenaciously adherent to the base to which applied, satisfactorily hard and of excellent whiteness.

This primer composition may be baked at a higher temperature, e. g., 400° F. for the same period of time with equally satisfactory coatings being obtained. The time and temperature of baking may be varied, if desired, as previously described.

Similar satisfactory results may be obtained by using lecithin in place of the cephaline.

A satisfactory range for the amount of thermal stabilizer to be used, based on the vinyl polymer resin solids has been found to be between approximately 1.0 and 7.5%, with a preferred range of between 2.5 and 5%. Amounts of less than approximately 1% have only a slight stabilizing effect and while amounts greater than approximately 7.5% (e. g., 10 to 25%) are effective as thermal stabilizers, the use of such amounts approaches the point of diminishing returns and is not economical, and when such high percentages are used the lecithin and cephaline may exude at high temperatures.

The present invention is generally applicable to compositions of interpolymers and copolymers of vinyl halides and vinyl esters of the lower fatty acids containing various percentages of the halide and ester. It is also of particular adaptability to vinyl halide polymers alone as well as to after treated vinyl halide polymers as halogenated vinyl halide polymers and the like. Such vinyl resin polymers, copolymers and interpolymers find wide commercial application as protective and decorative coatings. The vinyl resin polymer compositions of the present invention may be used to produce clear coatings or pigmented coatings. The vinyl resin polymers may be further plasticized where desired or necessary with other resinous materials or suitable softeners. Such modifications are readily understood by and will be apparent to those skilled in the art of using vinyl resin polymer compositions.

It will be apparent from the foregoing that means have been provided for preparing vinyl polymer resin compositions which produce strongly adherent and highly resistant coatings or finishes when baked at the higher temperatures normally required for resinous materials of this type. In unpigmented compositions the coatings or finishes produced are substantially colorless. In pigmented compositions, particulary white and light colored compositions, no discoloration occurs, and coatings of excellent color (or whiteness) are obtained. The thermally stabilized compositions of the present invention are free of objectionable ingredients and are thus applicable to broad general use. Further the thermally stabilized compositions are economical to prepare and use. Other advantages will be readily apparent to those skilled in the art of preparing and using vinyl polymer resin compositions.

It is apparent that many widely different embodiments of this invention may be made without departing from the spirit and scope thereof, and therefore, it is not intended to be limited except as indicated in the appended claims.

I claim:

1. A coating composition comprising a vinyl halide polymer, a light colored pigment and from 1% to 7.5% of material selected from the group consisting of lecithin and cephaline.

2. A coating composition comprising a vinyl resin containing a polymerized vinyl chloride, a white pigment, and from 2.5% to 5.0% of material selected from the group consisting of lecithin and cephaline.

3. The composition of claim 2 in which the vinyl resin is a copolymer of vinyl chloride and vinyl acetate.

4. A coating composition which bakes to a hard, color stable film when baked for about 30 minutes at 375° F. comprising a copolymer of vinyl chloride and vinyl acetate, white pigment, and about 5% of a stabilizer selected from the group consisting of lecithin and cephaline based on the vinyl resin polymer present.

5. A metallic surface having firmly bonded thereto by baking, a durable, color stable film containing a copolymer of vinyl chloride and vinyl acetate and from 1.0% to 7.5% of material selected from the group consisting of lecithin and cephaline based on the weight of the vinyl resin.

HORACE F. ETHER.